(12) United States Patent
Leonard

(10) Patent No.: US 7,818,961 B2
(45) Date of Patent: Oct. 26, 2010

(54) SYSTEM FOR STORING AN ADDITIVE AND FOR INJECTING IT INTO ENGINE EXHAUST GASES

(75) Inventor: Stephane Leonard, Brussels (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 133 days.

(21) Appl. No.: 11/721,876

(22) PCT Filed: Dec. 14, 2005

(86) PCT No.: PCT/EP2005/056797

§ 371 (c)(1), (2), (4) Date: Jun. 15, 2007

(87) PCT Pub. No.: WO2006/064028

PCT Pub. Date: Jun. 22, 2006

(65) Prior Publication Data

US 2009/0101656 A1   Apr. 23, 2009

(30) Foreign Application Priority Data

Dec. 15, 2004   (FR) .................................. 04 13368

(51) Int. Cl.
*F01N 3/00* (2006.01)

(52) U.S. Cl. .............................. 60/286; 60/274; 60/295; 60/301; 60/303; 60/315; 220/562

(58) Field of Classification Search .................. 60/286, 60/295, 301, 274, 296, 303, 315, 316
See application file for complete search history.

(56) References Cited

U.S. PATENT DOCUMENTS

| 4,926,829 | A | * | 5/1990 | Tuckey | 123/497 |
| 5,884,475 | A | * | 3/1999 | Hofmann et al. | 60/274 |
| 6,122,908 | A | * | 9/2000 | Wirmark | 60/274 |
| 7,654,080 | B2 | * | 2/2010 | Ripper et al. | 60/286 |
| 2002/0162457 | A1 | * | 11/2002 | Hyodo et al. | 96/109 |
| 2004/0247809 | A1 | | 12/2004 | Dubois et al. | |
| 2004/0256587 | A1 | | 12/2004 | Gerard et al. | |
| 2005/0067415 | A1 | | 3/2005 | Gerard et al. | |
| 2005/0284871 | A1 | | 12/2005 | Leonard et al. | |

FOREIGN PATENT DOCUMENTS

| DE | 44 32 577 | 3/1996 |
| WO | WO 00/21881 | 4/2000 |
| WO | WO 03/033111 | 4/2003 |

OTHER PUBLICATIONS

U.S. Appl. No. 12/297,249, filed Oct. 15, 2008, Martin.
U.S. Appl. No. 11/721,785, filed Jun. 14, 2007, Criel, et al.
U.S. Appl. No. 11/721,629, filed Jun. 13, 2007, Leonard.

* cited by examiner

*Primary Examiner*—Binh Q Tran
(74) *Attorney, Agent, or Firm*—Oblon, Spivak, McClelland, Maier & Neustadt, L.L.P.

(57) ABSTRACT

A system for storing an additive and for injecting the additive into exhaust gases of an internal combustion engine. The system includes a tank for storing the additive, an injector and a pump for conveying the additive from the tank to the injector via an injection line, and a purge device configured to force a purge gas to flow through the entire injection line either from the tank to the injector, or from the injector to the tank.

11 Claims, 3 Drawing Sheets

SYSTEM FOR STORING AN ADDITIVE AND FOR INJECTING IT INTO ENGINE EXHAUST GASES

BACKGROUND OF THE INVENTION

With the forthcoming entry into force of the Euro IV standard on vehicle exhaust emissions, NOx (or nitrogen oxide) pollution control devices must be installed.

The system selected by most automobile manufacturers for reducing NOx emissions to the requisite level generally consists in implementing a selective catalytic reaction with reducing agents such as urea ("Urea SCR" or Selective Catalytic Reduction using the ammonia generated in situ in the exhaust gases by the decomposition of urea).

For this purpose, it is necessary to equip the vehicles with a tank containing a urea solution, and a device for batching the quantity of urea to be injected into the exhaust line. Since the aqueous urea solution generally used for this purpose (eutectic with 32.5% by weight of urea) freezes at −11° C., it is necessary to provide a heating device to liquefy the solution in order to inject it into the exhaust line for starting in freezing conditions. Such a device is the subject of a co-pending application in the name of the applicant.

Furthermore, to facilitate the operation and restarting in the case of freezing, it is advantageous periodically to purge the lines that convey the urea in order to clear them of the liquid deposits of additives, which are liable to solidify in case of frost. In particular, it is advantageous to purge the line connecting the additive tank to the injector (or injection line). This also serves to avoid using a complex device for heating the urea lines.

Several systems have been provided for this purpose in the prior art.

Thus, U.S. Pat. No. 5,884,475 describes a system in which the injection line is subjected to consecutive purges respectively in the portion close to the additive tank and in the portion close to the injector. It uses a set of complicated and costly valves for this purpose.

Application WO 03/033111 describes a purge system that is simpler in terms of control/valves, but which has the drawback of bypassing the pump (and the neighbouring line portions) present on the injection line. Such a system is therefore less reliable.

BRIEF SUMMARY OF THE INVENTION

It is the object of the present application to solve these problems by proposing a system for storing a reducing additive and for injecting it into engine exhaust gases that is at once simple, effective and reliable, being designed to purge the entire injection line in a single step, in case of freezing below a given temperature and/or each time the engine stops running.

For this purpose, the present invention relates to a system for storing an additive and for injecting it into the exhaust gases of an internal combustion engine, the said system comprising a tank for storing the additive, an injector and a pump for conveying the additive from the tank to the injector via an injection line, the said system further comprising a purge device suitable for forcing a purge gas to flow through the entire injection line from the injector to the tank, the purge gas consisting of exhaust gases.

The additive concerned in the context of the invention is preferably a reducing agent suitable for reducing the NOx present in the exhaust gases of internal combustion engines. It is advantageously ammonia used directly (which has the associated drawbacks of safety and corrosion), or generated in situ in the exhaust gases using a precursor such as urea (thereby avoiding the above drawbacks). The invention yields good results with urea and, in particular, with aqueous solutions of urea. Eutectic solutions (comprising 32.5% by weight of urea) are suitable.

The present invention can be applied to any internal combustion engine liable to generate NOx in its exhaust gases. It may be an engine with or without a fuel return line (that is, a line returning the surplus fuel not consumed by the engine to the fuel tank). It is advantageously applied to diesel engines and, in particular, to vehicle diesel engines and, in a particularly preferred manner, to diesel engines of lorries.

The system according to the invention comprises at least one tank for storing the additive and at least one injection line for conveying the additive to an exhaust pipe of the engine. This line is equipped at its end with an injector for injecting the additive into the exhaust gases. In the case of lorry engines, this injector advantageously uses compressed air available in the brake circuit to disperse and inject the additive.

The system according to the invention further comprises a pump for conveying the additive from the additive tank to the injector. This pump may be located inside the additive tank (with the advantage of forming a compact and built-in module with it) or, given the corrosive environment, may be located outside the additive tank. Its constituent materials are preferably selected from corrosion resistant metals (certain grades of stainless steel and aluminium in particular). The use of copper, even for connection elements, is undesirable. The pump draws fuel from a point called the draw point in the additive tank. This point is connected to the pump by a line called the draw line.

According to the invention, "entire injection line" means not only the actual line but also any element/device that is located thereon and is traversed by the injection flow. Thus, if the pump is located outside the additive tank, on the injection line, it is also purged (because it forms an integral part of the injection line).

On the contrary, the elements located inside the tank, and which are therefore not directly part of the injection line (even if placed in series therewith) are not necessarily purged in the system according to the invention, because the tank can be heated easily (see below and the abovementioned co-pending application). Thus, if the pump is inside the additive tank, it does not necessarily have to be purged.

As a rule, the system according to the invention comprises a computer connected to the injector for injecting the requisite quantity of additive into the exhaust gases (particularly according to the following parameters: NOx emission and conversion rate; temperature and pressure; engine speed and load; etc.) The quantity of additive discharged by the pump and not consumed by the injector (according to the control by the computer) is advantageously returned to the additive tank via a line called the additive return line. This line is generally equipped with a pressure controller (a device that opens when the pressure increases owing to the closure of the injector at certain moments while the pump is discharging). It connects either the injector or another point on the injection line, downstream of the pump, to the additive tank. In the case of a pump outside the tank, the return line is therefore also at least partially outside the tank. In the case of a pump located inside the additive tank, this line is preferably also inside the tank, thereby avoiding the need to be purged (see below).

In the case in which the additive return line is outside the tank, it is advantageous in the context of the invention for it to be also purged (whereas this is unnecessary if it is inside the tank and if the tank can be heated: see below and abovementioned co-pending application).

The system according to the invention finally comprises a purge device suitable for forcing a purge gas to flow through the pump and the entire injection line, either from the tank to the injector, or from the injector to the tank. This purge is generally initiated by the abovementioned computer, generally in case of freezing below a given temperature and/or each time the engine stops running.

Such a device may be of any known type. In practice, in the context of the invention, three particular devices are suitable:
either a compressed air tank and a purge line equipped with a valve for passing the compressed air through the said line;
or a switch for reversing the flow of the pump (6);
or a 4/2-way valve (14) which, using suitable fittings/lines, produces the same effect.

The operating mode of these devices will be described below, in the "method" aspects of the invention. In fact, it appears from the above that a further object of the present invention is to provide a method using a device as described above.

Moreover, the present invention further relates to a method for storing an additive and for injecting it into an exhaust pipe of an internal combustion engine, the said method essentially consisting in conveying an additive stored in a tank to an injector using a pump and via an injection line, and in injecting it into the exhaust pipe using the injector, the said method further consisting in sporadically purging the injection line by the flow of a purge gas through the entire line from the injector to the tank, the purge gas consisting of exhaust gases.

In view of the above, this method is advantageously used in the case in which the additive is an aqueous urea solution.

According to a first variant of this method, the purge gas is compressed air that is admitted into the injection line using a valve located on a purge line connected to a compressed air tank. This variant is advantageously used when compressed air is available on the vehicle for other purposes (brake circuit, for example, which is frequently the case in lorries). In this case, the compressed air pressure is higher than the tare pressure of the pressure controller, if any.

According to this variant, during a purge, compressed air is injected into the injection line, directly at the outlet of (or into) the additive tank and up to the injector in order to purge the entire injection line. It is therefore advantageous to close the injector during the purge to avoid injecting compressed air and purged additive into the exhaust gases. In this case, it is therefore necessary to return the additive-laden compressed air stream to the additive tank, so that a return line is necessary outside the tank, connecting the injector to the said tank. This variant therefore operates advantageously with a return line extending directly from the injector to the tank, and hence with a return line outside the tank, either entirely (if the pump is located outside the tank) or partially (if the pump is located inside the tank). In this case, a tank ventilation device is advantageously used to remove the compressed air returned to the tank by the return line during the purge phases.

In this variant, the pump is advantageously a conventional pump, operating so as to discharge in a given direction (the additive feed direction). As explained above, this pump must be traversed by the compressed air if it is outside the additive tank. Hence in practice, when the pump is outside the tank, the compressed air is injected upstream of the pump and, therefore, into the draw line of the pump, and preferably, directly at the outlet of (or into) the tank, to purge the entire injection line. In this case, it is therefore preferable to provide the draw line with a nonreturn valve to prevent compressed air from directly entering the additive tank. In consequence, advantageously, when the pump is located outside the tank, the compressed air is injected upstream of the pump, at a point of the draw line located in the tank and downstream of a nonreturn valve. If, on the contrary, the pump is located inside the tank, it must not necessarily be purged, and the compressed air could be injected downstream of the pump, without the use of a nonreturn valve.

According to a second variant, the purge gas consists in fact of engine exhaust gas or ambient air which is sucked into the injection line by a suitable device, via the exhaust line. If the pump can operate in two opposing directions and generate reverse flows, this device may be a simple switch that has the effect of reversing the flow of the pump, or a 4/2-way valve, which, in normal mode (additive injection) connects a point downstream of the pump to the injector, and in purge mode, connects the injector to a point upstream of the pump, which has somewhat the same effect as reversing the flow of the pump (the upstream and downstream points being reversed by the valve).

According to this variant (in which the exhaust gases are admitted into the injection line to carry out the purge), the injector must obviously be open during a purge. In consequence, in this variant, the return line, if any, may not be purged if it starts from the injector.

Exhaust gases have in general a high temperature while the engine is running: for instance, temperature values of about 600-700° C. are possible. On the case where the injection line is purged after the shut-off of the engine, one can for example envisage a delay between the moment where the engine is shut-off and the moment where the exhaust gases are sucked in order to prevent deterioration of the injection line.

The delay is chosen as such as the temperature of the exhaust gases decreases to a value compatible with a circulation in the injection line without deterioration.

Preferably the temperature of the exhaust gases is controlled and regulated by any means known to a person skilled in the art.

If the purge device consists of the pump running in the reverse direction, the return line, if any, is in fact purged slightly or not at all, because the pump will tend to force the exhaust gas flow into the injection line in which it is located, and not into the return line. This means that, in this variant, the pump is preferably located inside the additive tank so that the return line can also be located inside the tank and can thus be heated before starting the pump, if necessary (see below).

On the contrary, if a correctly connected 4/2-way valve is used (as explained above: in order to connect a point downstream of the pump to the injector in additive injection mode, and to connect the injector to a point upstream of the pump in purge mode), the pump may either be inside or outside the tank without jeopardizing the operation of the method. In fact, it suffices to connect the valve so that the pump is upstream of the starting point of the return line in purge mode to make it force the exhaust gas flow through this line. It should be noted, however, that if the pump is outside the tank, the draw line is not properly purged.

It should be noted that in the context of the invention, the terms "upstream" and "downstream" must be considered in the fluid flow direction, an upstream point being by definition located before a downstream point on this line.

As explained above, it is the object of the present invention to facilitate the operation and starting of a de-NOx (nitrogen oxide cleansing) unit on an internal combustion engine. For this purpose, it is advantageous for the purge to be initiated whenever the temperature falls too low in operation (for example, below −10° C., preferably below −5° C. or even, below 0° C. for greater safety) and systematically, each time the engine stops running, to prevent any additive residues from freezing.

As regards the starting aspect, it may obviously happen that the tank itself is frozen. To correct this situation, according to an advantageous variant, the system according to the invention comprises a device capable of thawing the additive tank if necessary and, preferably, as rapidly as possible after starting the engine. Such a device may be a resistor, a bypass of the engine cooling circuit, or a bypass of the hot fuel return (in the case of direct injection engines).

The latter variant is preferred whenever applicable. It is equivalent to ensuring that the hot fuel return line from the engine to the fuel tank comprises at least one section called a heating section, in thermal contact with the additive present in the tank and suitable for heating/thawing it before its injection into the engine exhaust gases. It is particularly advantageous for the heating section to have at least partially the form of a coil (winding or reciprocating loops). In a particularly preferred manner, this coil at least partially surrounds the additive suction point. The coil may be formed using a straight stainless steel tube or a corrugated plastic tube (which is more economical and offers a larger heat exchange area, but has the drawback of lower thermal conductivity). It may also be designed so that only its "active" portion (the actual coil, as opposed to its ends) is located in the bottom of the additive tank, so as to avoid heating it on the surface and thereby generating corrosive or malodorous vapours.

According to a particularly advantageous variant, the subject of the abovementioned co-pending application, the heating section is short-circuited if the temperature detected by a temperature sensor is too high (above a threshold value). This sensor may also serve for other functions in the system and, in particular, to communicate with the above computer and to improve the additive metering accuracy.

Since the heating section can be bypassed, the system according to this variant of the invention is suitable for easily cooling the hot fuel not consumed by the engine, before supplying it to the tank and regardless of the temperature conditions. For this purpose, it suffices for example to provide the above bypass line with a heat exchanger. In fact, if the additive temperature is lower than the threshold value of the temperature sensor, the fuel will flow in the heating section, heat the additive and then cool. And if the temperature of the additive exceeds this threshold temperature, the fuel will flow in the bypass line where it can be cooled by the heat exchanger.

BRIEF DESCRIPTION OF THE DRAWINGS

The present invention is illustrated in non-limiting manner by FIGS. 1 to 4, each pertaining to a different variant.

DETAILED DESCRIPTION OF THE INVENTION

Figure 1:
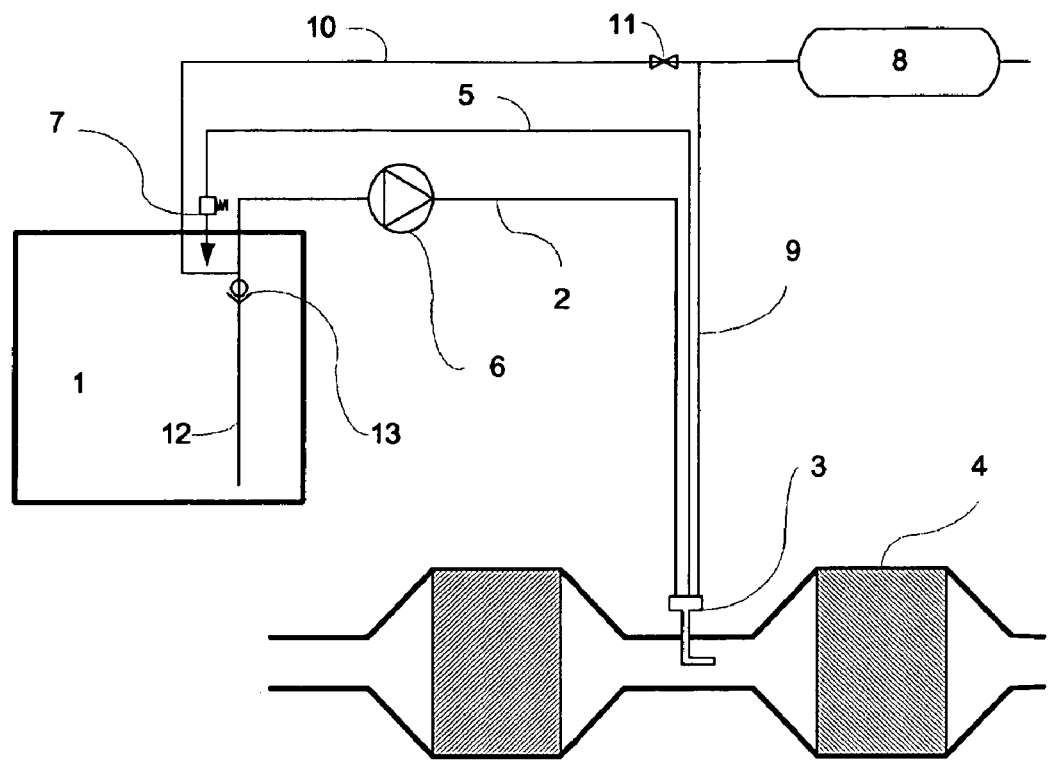
FIG. 1 shows a variant in which the purge gas is compressed air, and FIGS. 2 to 4, variants in which the purge gas consists of exhaust gases, but in different ways of being sucked in. In these figures, identical numerals designate identical elements.

FIG. 1 shows a variant of the system according to the invention, comprising an additive tank (1) containing an aqueous urea solution containing 32.5% by weight of urea (eutectic), an injection line (2) extending from the tank (1) to an injector (3) located at the exhaust pipe (4), and a return line (5) returning unconsumed additive to the additive tank (1). The injection line (2) comprises a pump (6), outside the tank (1) and the return line, and a pressure controller (7). This controller (7) comprises a diaphragm and a spring that keeps the diaphragm in the closed position as long as the pressure has not exceeded a certain value.

This system comprises a purge device including a compressed air reserve (8) which feeds compressed air to the injector (3) via a feed line (9), thereby serving to vaporize the additive. This reserve (8) also communicates with the additive tank (1) via a purge line (10) equipped with a valve (11) that opens when a computer (not shown) initiates a purge. This line terminates upstream of the pump, on a part of the draw line (12) located inside the additive tank (1). This portion of draw line (12) is equipped with a nonreturn valve (13) preventing the compressed air from entering the tank (1).

In normal operating mode (additive injection), the pump (6) initiates an additive flow from the tank (1) to the injector (3) via the injection line (2), and this additive is injected into the exhaust gases by means of the injector that uses the compressed air conveyed by the line (9). The surplus additive not consumed by the injector (3) is returned to the tank via the return line (5) through the pressure controller (7). During a purge, the computer opens the valve (11) and compressed air is injected into the line (10), then into the injection line (2), through the pump (6). When the injector is closed, the purged additive is returned to the tank (1) by the return line (5).

Figure 1B:
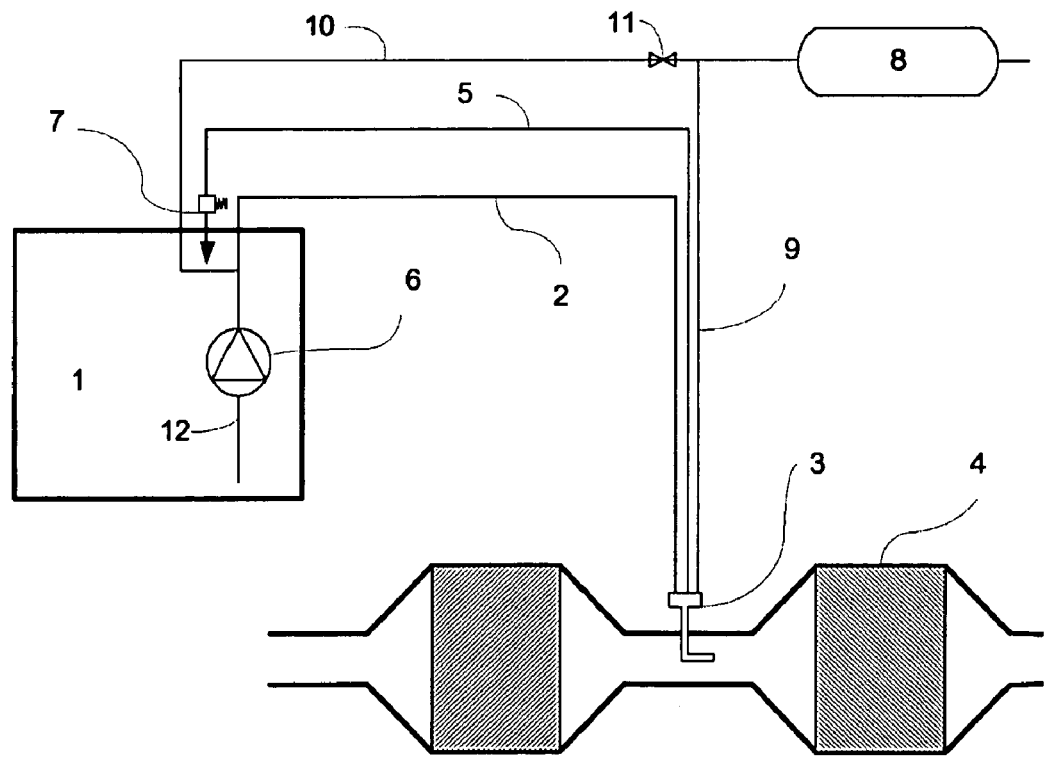

FIG. 1b also relates to a compressed air purge system, but in which the pump (6) is located inside the tank and is therefore bypassed by the purge, the compressed air being injected downstream. The other elements of this system are identical to those of FIG. 1.

Figure 2:
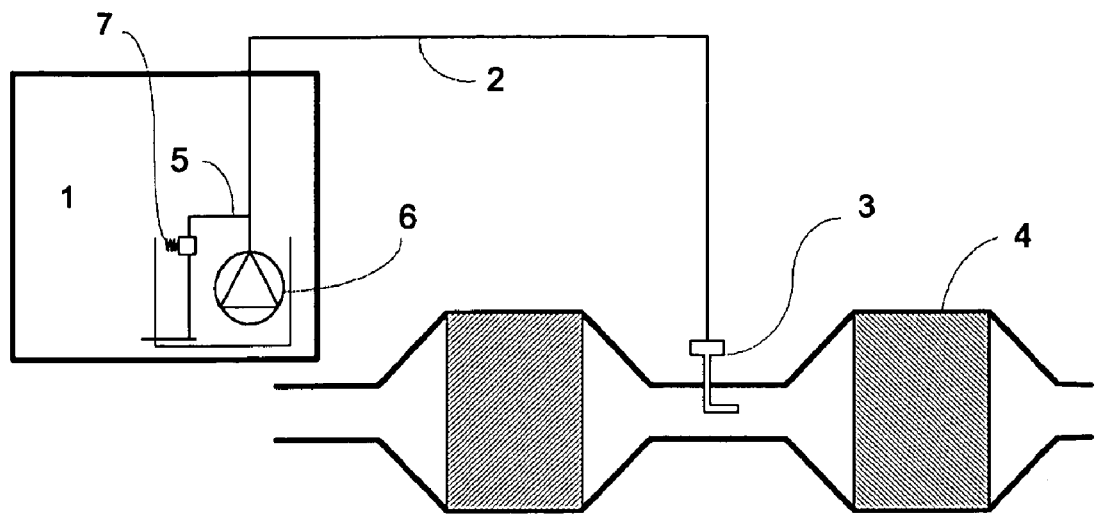

FIG. 2 shows a variant in which the purge gas consists of vehicle exhaust gas and in which the pump (6), which is located inside the tank, is used for the purge. In normal operating mode (additive injection), the pump (6) initiates an additive flow from the tank (1) to the injector (3) via the injection line (2) and the surplus is returned to the tank via the return line (5) also arranged inside the tank, and equipped with a pressure controller (7). During a purge, the pump initiates an exhaust gas flow from the injector (3) to the tank (1), which entrains the purged additive to the tank (1).

Figure 3:
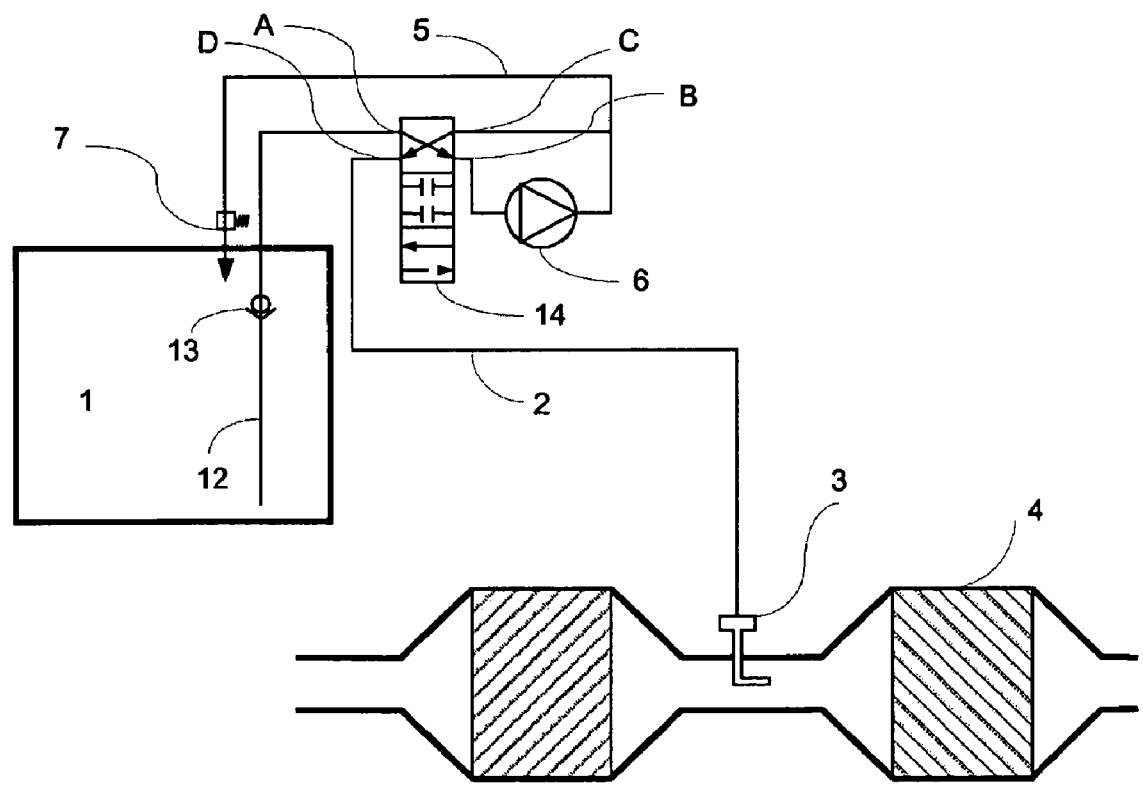
Figure 4:
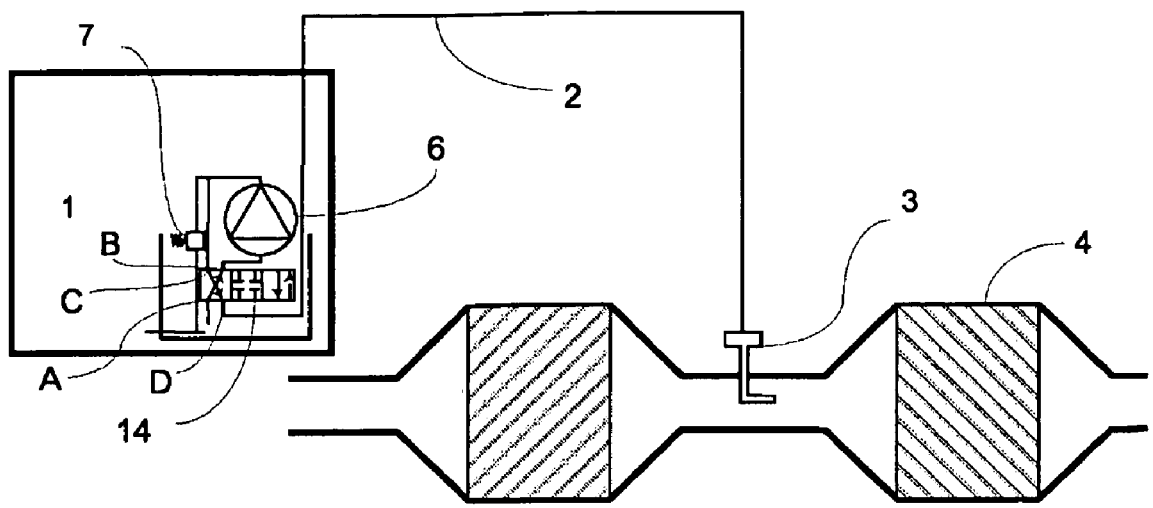

FIGS. 3 and 4 also show variants in which the purge gas consists of vehicle exhaust gas, but the flow reversal is caused this time by a 4/2-way valve (14), and not by the pump (6), which is a "normal" pump here, causing flow in a single direction. In additive injection mode, this valve (14) serves to connect the points A and B on the one hand, and the points C and D on the other, and in this order (that is, the additive flow first passes to point A, then to point B, then to point C and finally to point D). On the contrary, in purge mode, it connects the points D and B, and C and A, respectively, and also in this order.

In each of these variants, all the lines/elements outside the tank (1) which have contained additive are purged in a single step: either by opening a valve (11) communicating with a compressed air reserve (8) (FIG. 1), or by reversing the flow direction of the pump (6) (FIG. 2), or by reversing the operating mode of a 4/2-way valve (14) (FIGS. 3 and 4). These systems are simple, effective and rapid.

The invention claimed is:

1. A system for storing an additive and for injecting the additive into exhaust gases of an internal combustion engine, the system comprising:

a tank to store the additive;

an injector and a pump to convey the additive from the tank to the injector via an injection line; and a purge device configured to force a purge gas to flow through the entire injection line from the injector to the tank, the purge gas including engine exhaust gases.

2. The system according to claim 1, wherein the purge device comprises:

a switch to reverse the flow of the pump.

3. The system as claimed in claim 1, further comprising an additive return line including a pressure controller, and the pressure controller is located outside the tank when the pump is located outside the tank.

4. A method for storing an additive and for injecting the additive into an exhaust pipe of an internal combustion engine, the method comprising:

conveying an additive stored in a tank to an injector using a pump and via an injection line;

injecting the additive into the exhaust pipe using the injector; and sporadically purging the injection line by flow of a purge gas through the entire injection line from the injector to the tank, the purge gas including engine exhaust gases.

5. The method according to claim 4, wherein the additive is an aqueous urea solution.

6. The method according to claim 4, wherein the engine exhaust gases are sucked into the injection line by opening the injector and by actuating a switch that has an effect of reversing a flow of the pump.

7. The method according to claim 4, wherein the engine exhaust gases are sucked into the injection line by switching a 4/2-way valve that in a normal mode connects a point downstream of the pump to the injector, and in a purge mode, connects the injector to a point upstream of the pump.

8. The method according to claim 4, wherein a temperature of the exhaust gases is controlled and/or regulated.

9. The method according to claim 4, wherein, when the additive is frozen, the additive is melted before starting the pump and a temperature of the additive is maintained within a given range as long as the pump is running.

10. The system as claimed in claim 1, further comprising an additive return line including a pressure controller, and the pressure controller is located inside the tank when the pump is located inside the tank.

11. The system according to claim 1, wherein the purge device comprises:

a 4/2-way valve.

* * * * *

UNITED STATES PATENT AND TRADEMARK OFFICE
CERTIFICATE OF CORRECTION

PATENT NO. : 7,818,961 B2                                                           Page 1 of 1
APPLICATION NO. : 11/721876
DATED : October 26, 2010
INVENTOR(S) : Stephane Leonard It is certified that error appears in the above-identified patent and that said Letters Patent is hereby corrected as shown below:

On the Title page, after Item (86) and before Item (87) please insert the following as the 371 date:

--September 19, 2008--

Signed and Sealed this

First Day of March, 2011

David J. Kappos
*Director of the United States Patent and Trademark Office*